(No Model.)
J. DECKER.
RICE BEATER.
No. 271,810. Patented Feb. 6, 1883.
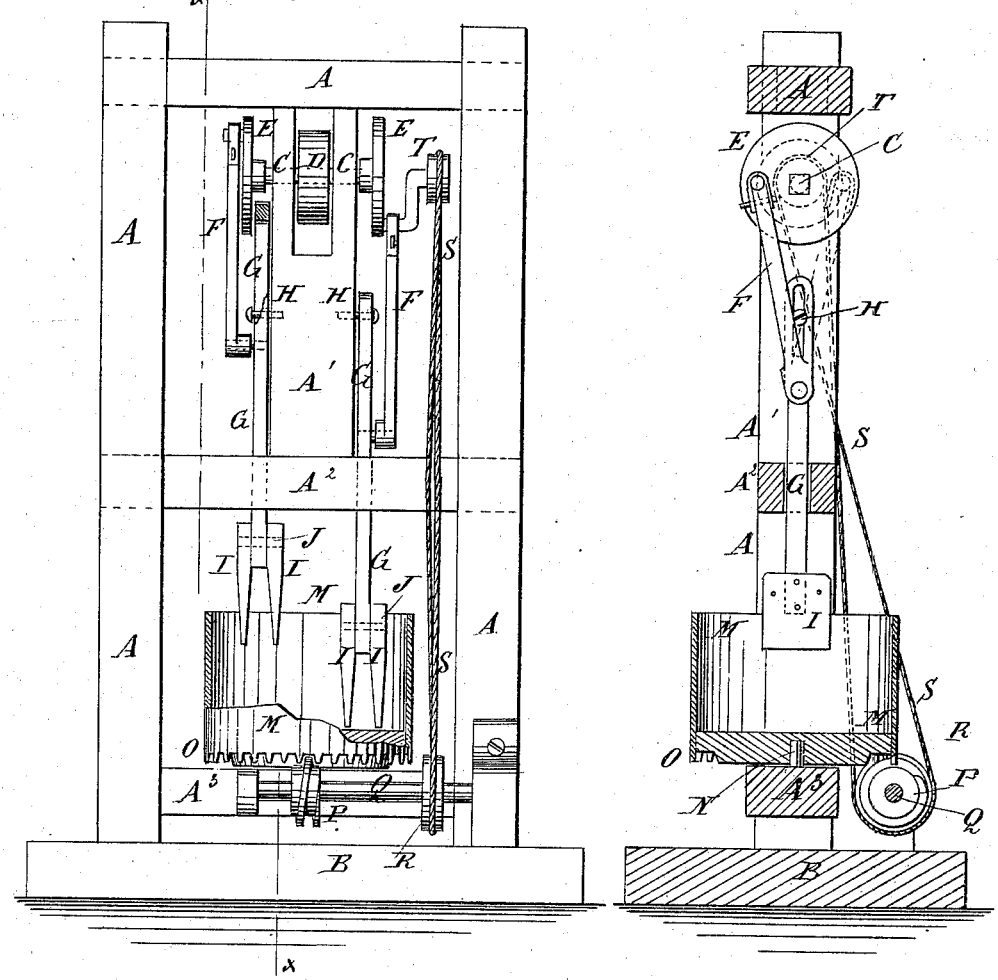
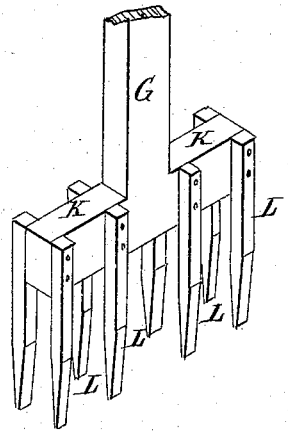
WITNESSES:
Chas. Nida.
C. Sedgwick
INVENTOR:
J. Decker
BY Munn & Co
ATTORNEYS.

UNITED STATES PATENT OFFICE.

JAMES DECKER, OF SURRENCY, GEORGIA.

RICE-BEATER.

SPECIFICATION forming part of Letters Patent No. 271,810, dated February 6, 1883.

Application filed April 25, 1882. (No model.)

*To all whom it may concern:*

Be it known that I, JAMES DECKER, of Surrency, in the county of Appling and State of Georgia, have invented a new and useful Improvement in Rice-Beaters, of which the following is a full, clear, and exact description.

Reference is to be had to the accompanying drawings, forming a part of this specification, in which similar letters of reference indicate corresponding parts in all the figures.

Figure 1 is a front elevation of my improvement, partly in section. Fig. 2 is a sectional elevation of the same, taken through the broken line $x\ x$, Fig. 1. Fig. 3 is a perspective view of the pestle, showing a modified form.

The object of this invention is to facilitate the beating of rice, to remove the inner skin, and clean and polish the kernels after the rice has been hulled.

The invention consists in the peculiar construction and combination of the parts, as will be hereinafter fully described and claimed.

A is a vertical frame, which is attached to a base, B, of such a length and breadth as will give a stable support to the machine.

To the upper part of a central bar, A', of the frame A is journaled a crank-shaft, C, to the middle part of which is attached a pulley, D, to receive a driving-belt.

To the cranks of the shaft C, or to crank-wheels E, attached to the said shaft, are pivoted the upper ends of pitmen F, the lower ends of which are pivoted to the bars G, that slide up and down along the central bar, A', of the frame A, and are slotted vertically to receive the guide-pins H, attached to the said central bar, A', to cause the said bars G to move up and down vertically. The slide-bars G pass through guide-holes in the central cross-bars, A², of the frame A, and to the opposite sides of their lower ends are bolted boards I, which are tapered toward their lower ends, and serve as pestles to beat the rice. By placing blocks against the outer sides of the upper ends of the boards I, and other boards against the said blocks, and lengthening the bolts J, that secure the boards I to the bars G, so as to pass through the added blocks and boards, the pestles can be enlarged to any desired extent. If desired, a cross-bar, K, can be attached to the lower end of each bar G, and downwardly-projecting tapered bars L attached to the said cross-bar K. In this case the bars L are designed to be coated with emery, or made of stone, to cause the pestles to operate upon the rice more quickly. The cranks of the crank-shaft C project in opposite directions, so that the pestles I will always move in opposite directions to balance the machine and allow the rice to have a free movement when operated upon by a pestle.

M is the mortar, which is made in the form of a cylindrical tub, and is pivoted at the center of its bottom to a pivot, N, attached to the lowest cross-bar, A³, of the frame A.

To the bottom of the mortar M is attached, or upon it is formed, a worm-wheel, O, the teeth of which mesh into the threads of a worm, P, attached to the shaft Q. The worm-wheel and worm can be replaced by beveled-gear wheels, if desired. The shaft Q revolves in bearings attached to the lower part of the frame A, and to it is attached a pulley, R, around which passes an endless band, S. The band S also passes around a pulley, T, attached to the crank-shaft C, as shown in Fig. 1. By this construction the pestles I will be operated and the mortar M rotated by the revolution of the crank-shaft C, and the pestles will thus be brought in contact with all the rice in the mortar. With this construction the inner skin of the rice-kernels will be quickly beaten and rubbed off, cleaning and polishing the said kernels, and any kernels of green rice contained in the mortar will be ground to powder. After the rice has been sufficiently beaten, the dust is blown off by fans in a fanning-mill or other suitable machine.

Having thus described my invention, I claim as new and desire to secure by Letters Patent—

1. A rice-beater constructed substantially as herein shown and described, consisting of the frame A B, the crank-shaft C, the pitmen F, the sliding bars G, the pestles I, the rotary mortar M, and its driving-gearing, as set forth.

2. In a rice-beater, the combination, with the sliding bars G, carrying the pestles I, of the crank-shaft C, the pitmen F, and the guide-pins H, substantially as herein shown and described, whereby the pestles will be operated in vertical lines by the revolution of the crank-shaft, as set forth.

3. In a rice-beater, the pestles consisting of two or more tapered boards, I I, in combination with the lower ends of the slide-boards G, substantially as herein shown and described.

4. In a rice-beater, the combination, with the rotary mortar M and the crank-shaft C, of the worm-wheel and worm O P, and the pulleys and band R T S, substantially as herein shown and described, whereby the mortar will be rotated by the shaft that operates the pestles, as set forth.

JAMES DECKER.

Witnesses:
JAMES A. McGLOTHLIN,
FREDERICK F. W. DECKER.